United States Patent
Eum et al.

[11] Patent Number: 5,944,426
[45] Date of Patent: Aug. 31, 1999

[54] FLUID BEARING APPARATUS

[75] Inventors: Jae-yong Eum; Chang-woo Lee, both of Kyonggi-do, Rep. of Korea

[73] Assignee: Samsung Electronics Co., Ltd., Kyungki-do, Rep. of Korea

[21] Appl. No.: 08/960,597

[22] Filed: Oct. 30, 1997

[30] Foreign Application Priority Data

Oct. 30, 1996 [KR] Rep. of Korea ............. 96-50379

[51] Int. Cl.⁶ .................... F16C 32/06; F16C 21/00
[52] U.S. Cl. ................................. 384/107; 384/126
[58] Field of Search ............................. 384/101, 100, 384/107, 111, 112, 114, 126

[56] References Cited

U.S. PATENT DOCUMENTS

| | | | |
|---|---|---|---|
| 4,805,972 | 2/1989 | Tanaka et al. | 384/107 X |
| 5,114,245 | 5/1992 | Tanaka et al. | 384/107 X |
| 5,289,067 | 2/1994 | Tanaka et al. | 384/107 X |
| 5,445,456 | 8/1995 | Isoda et al. | 384/126 |
| 5,683,183 | 11/1997 | Tanaka et al. | 384/101 X |
| 5,711,612 | 1/1998 | Itoh et al. | 384/107 |

FOREIGN PATENT DOCUMENTS 258522  9/1992  Japan ...................... 384/101

*Primary Examiner*—Thomas R. Hannon
*Attorney, Agent, or Firm*—Sughrue, Mion, Zinn, Macpeak & Seas, PLLC

[57] ABSTRACT

A fluid bearing apparatus includes a thrust load supporting portion formed between an external side surface of a fixing shaft and an internal side wall of an opening in a bushing; the surface and wall facing each other. The thrust load supporting portion includes a ball inserting groove formed on the external side surface of the fixing shaft and/or the internal side wall of the bushing and a ball inserted into the ball inserting groove. The upper end portion of the shaft is lower than the upper end portion of the bushing. Since the thrust load is supported by the balls instead of by the upper end portion of the fixing shaft, it is possible to prevent movement of the fixing shaft when the fluid bearing apparatus starts to rotate. The frictional resistance of the upper end portion of the fixing shaft can be reduced when the fluid bearing apparatus starts to rotate and stops its rotation.

14 Claims, 5 Drawing Sheets

FLUID BEARING APPARATUS

BACKGROUND OF THE INVENTION

1. Field of the Invention

The present invention relates to a fluid bearing apparatus, and more particularly, to a fluid bearing apparatus in which a thrust load supporting portion is formed between an external side of a fixing shaft and an internal side of a bushing, which faces the fixing shaft.

2. Description of the Related Art

Recently, with the improvement of technologies in the information and computer industries, there has been a trend to provide high speed driving motors with rotary shafts which are highly accurate, have no oscillation and provide superior high speed rotation performance. Driving motors of this type are required for various machines, such as a polygon mirror driving gear of a laser printer, a spindle motor of a hard disk, a head driving motor of a VCR, and the like. In this respect, a driving motor capable of stably rotating at high speed has been developed together with a fluid bearing apparatus, which enables the rotary shaft of the driving motor to rotate at high speed with high accuracy.

A conventional fluid bearing apparatus which is mainly used in a polygon mirror driving gear of a laser printer is shown in FIG. 1.

Referring to FIG. 1, a polygon mirror 10 mounted on a thrust bearing 25 reflects laser beams onto a photosensitive drum. A driving gear for rotating the polygon mirror 10 at a predetermined revolutions per minute (rpm) includes a bushing 30 and a plate 50. The thrust bearing 25 is fixed to the bushing 30. A fixing shaft 40 is inserted into a through hole of the bushing 30, and the outer surface of the shaft 40 is separated from the inner wall of bushing 30 by a predetermined amount. On the outside of the fixing shaft 40, a herring bone shaped first kinetic pressure generating groove 45 is formed. In the thrust bearing 25 which faces an upper end portion of the fixing shaft 40, a second kinetic pressure generating groove 20 is formed.

The operation of the fluid bearing apparatus as aforementioned will now be described below.

If the power source is applied to a stator (not shown), the plate 50 rotates by electromagnetic action between the stator and a rotor (not shown) onto which the plate 50 is mounted. The plate 50 and the bushing 30, which is combined with the plate 50, rotate. Also, the thrust bearing 25 and the polygon mirror 10 rotate together. At this time, a fluid flows into a fluid inlet groove 45a of the first kinetic pressure generating groove 45 in the fixing shaft 40, so that a fluid pressure occurs. As a result, a predetermined clearance is formed between the fixing shaft 40 and the bushing 30 to support a radial load caused by rotation.

The fluid flows into a center portion on the upper end portion of the fixing shaft 40 through the second kinetic pressure generating groove 20 from edge portions on the upper end portion of the fixing shaft 40, so that the fluid pressure occurs. A minimum fluid pressure $P_{min}$ which boosts the thrust bearing 25 occurs as the rotative speed increases. The thrust bearing 25 rotates without contacting with the fixing shaft 40.

However, the conventional fluid bearing apparatus has several problems.

That is, in order for the thrust bearing 25 to rotate without contacting with the fixing shaft 40, a predetermined rotative speed of the thrust bearing 25 is required. In particular, there must separately be provided a thrust bearing in which a second kinetic pressure generating groove is formed to support a thrust load which occurs in the polygon mirror.

SUMMARY OF THE INVENTION

Accordingly, the present invention is directed to a fluid bearing apparatus that substantially obviates one or more of the problems due to limitations and disadvantages of the related art.

An object of the present invention is to provide a fluid bearing apparatus which prevents movement of a fixing shaft when the fluid bearing apparatus starts to rotate.

Another object of the present invention is to provide a fluid bearing apparatus which reduces frictional resistance of an upper end portion of a fixing shaft when the fluid bearing apparatus starts to rotate and stops its rotation.

Other object of the present invention is to provide a fluid bearing apparatus in which the number of components is reduced by removing a thrust bearing.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a fluid bearing apparatus according to the present invention includes a bushing having a plate mounted on its lower end portion, the plate having a rotor, a polygon mirror fixed to an upper end portion of the bushing, a fixing shaft inserted into the bushing, having a kinetic pressure generating groove on its external side, and a thrust load supporting portion formed between the external side of the fixing shaft and an internal of the bushing which face each other.

In one preferred embodiment of the present invention, the thrust load supporting portion includes a ball inserting groove formed on the external side of the fixing shaft, and a ball inserted into the ball inserting groove.

In another preferred embodiment of the present invention, the thrust load supporting portion includes a ball inserting groove formed on the internal side of the bushing, and a ball inserted into the ball inserting groove.

In other preferred embodiment of the present invention, the thrust load supporting portion includes a first ball inserting groove formed on the external side of the fixing shaft, a second ball inserting groove formed on the internal side of the bushing to face the first ball inserting groove, and balls respectively inserted into the first and second ball inserting grooves.

In the preferred embodiments of the present invention, the first ball inserting groove has a v-shaped section and the second ball inserting groove has a hemispheric shaped section. The thrust load supporting portion is formed to separate the upper end portion of the fixing shaft from the upper end portion of the bushing at a predetermined interval, so that the upper end portion of the fixing shaft is lower than that of the bushing. The ball inserting groove is formed in a series along a circumferential direction in the external side of the fixing shaft or in the internal side of the bushing, at a predetermined interval. The ball inserting groove has a bottom portion at a boundary between the internal side of the bushing and the plate for good workability.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
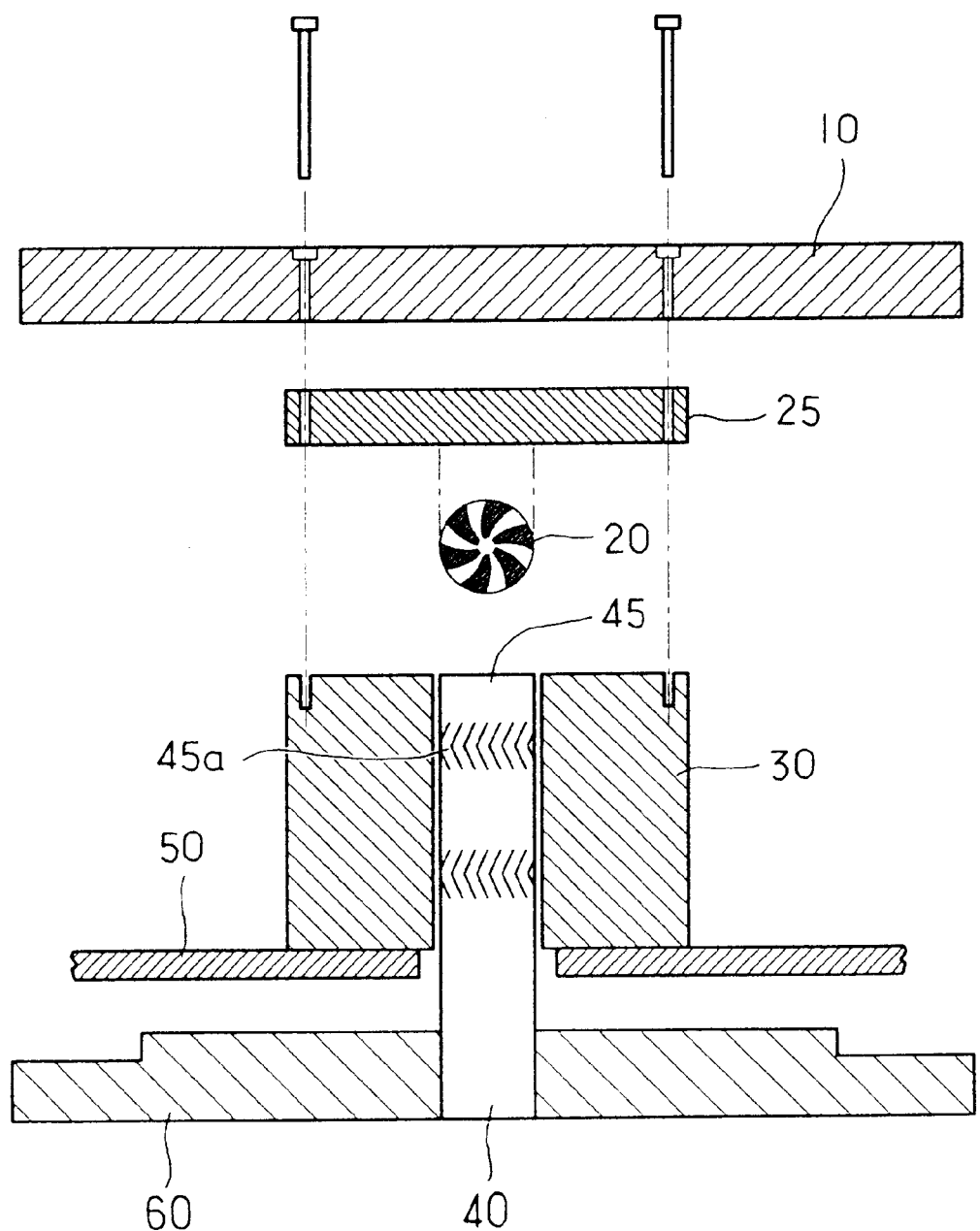
FIG. 1 is a sectional view illustrating a conventional fluid bearing apparatus which is applied to a polygon mirror driving gear of a laser printer.
Figure 2:
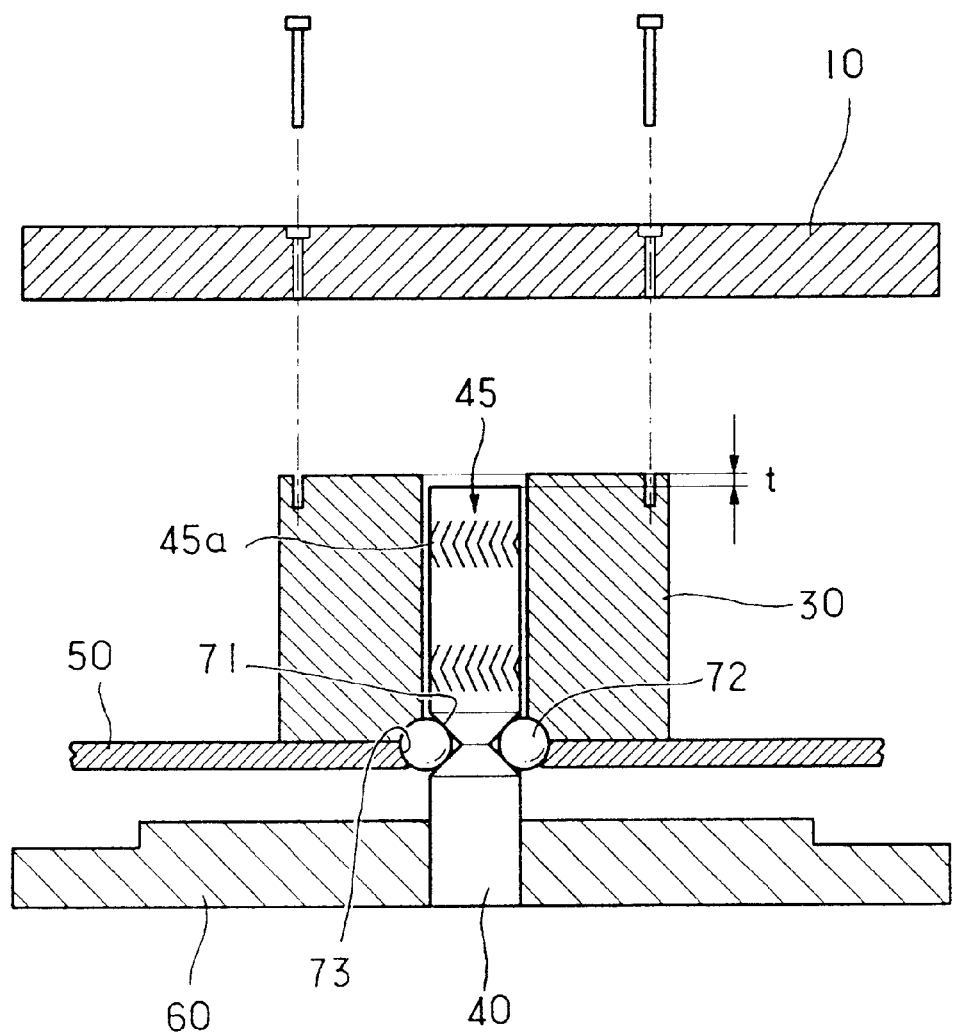
FIG. 2 is a sectional view illustrating a fluid bearing apparatus according to the present invention, which is applied to a polygon mirror driving gear of a laser printer.

Referring to FIG. 2, a polygon mirror 10 is detachably mounted on a bushing 30 by a screw or the like. The polygon mirror 10 is made of material having high reflecting properties to reflect laser beams. A fixing shaft 40 is inserted into the bushing 30. In the fixing shaft 40, a herring bone shaped first kinetic pressure generating groove 45 is formed. A fluid flows into a fluid inlet groove 45a of the first kinetic pressure generating groove 45 by rotation of the bushing 30. As a result, a predetermined clearance is formed between the fixing shaft 40 and the bushing 30 to support a radial load due to the rotation.

Meanwhile, a plate 50 is mounted on a lower end portion of the bushing 30. The plate 50 is mounted on a rotor (not shown). A stator (not shown) has mounted thereon a lower bearing bracket 60 to face the rotor.

Figure 3:
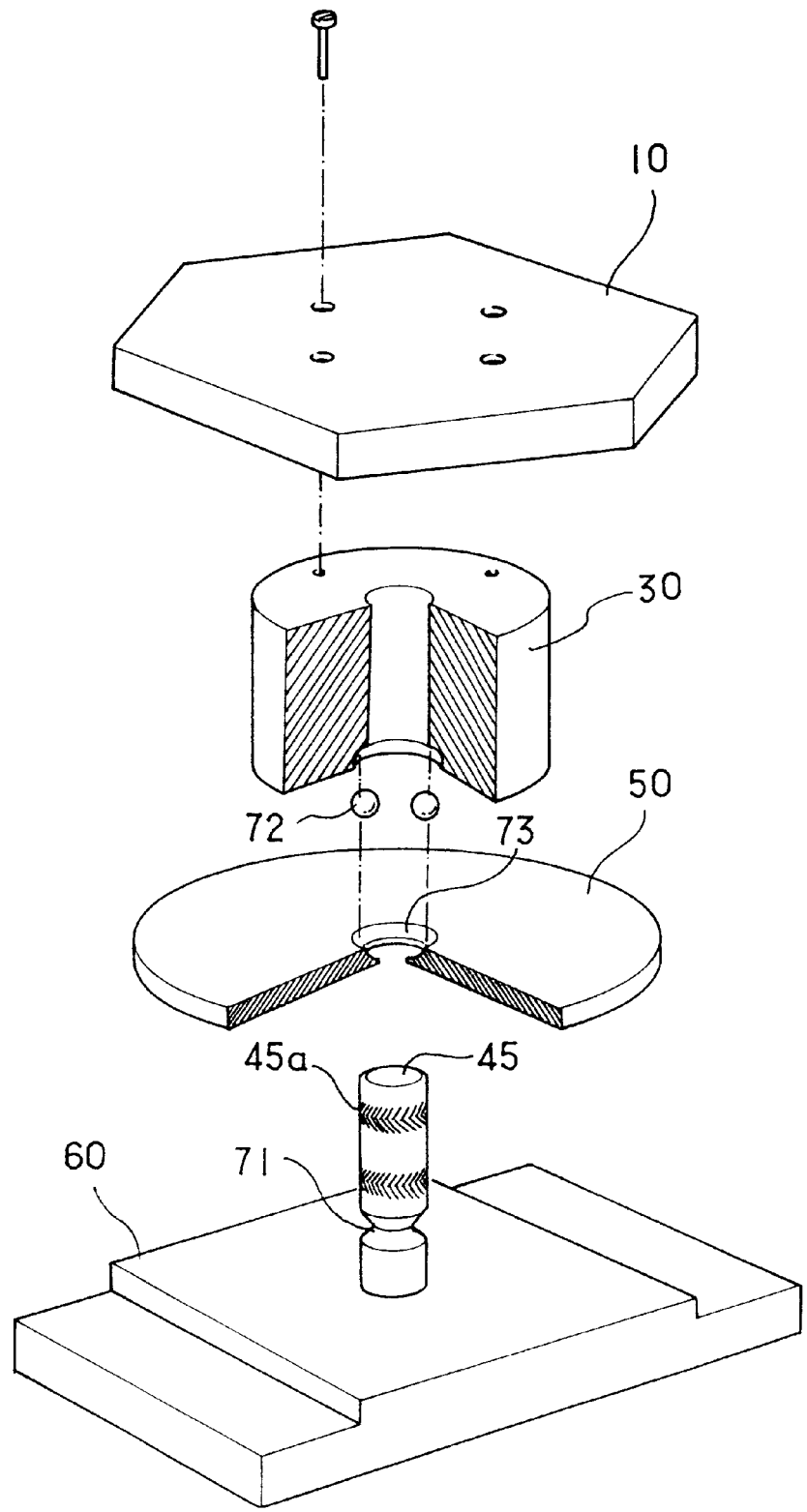
FIG. 3 is an exploded view illustrating a fluid bearing apparatus according to the present invention.
Figure 4:
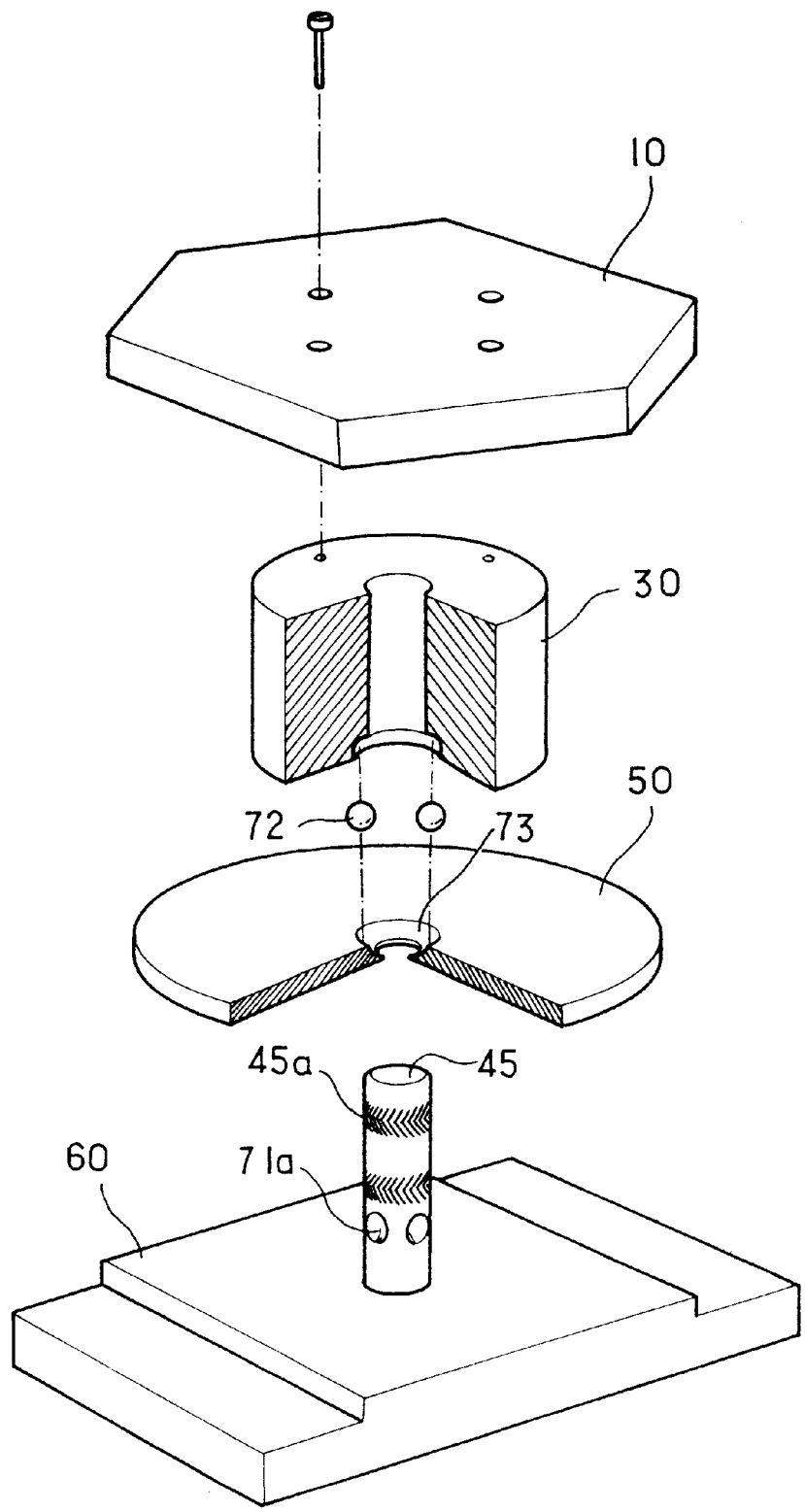
FIG. 4 is an exploded view illustrating a fluid bearing apparatus having individual ball inserting grooves formed on the fixing shaft of the present invention.
Figure 5:
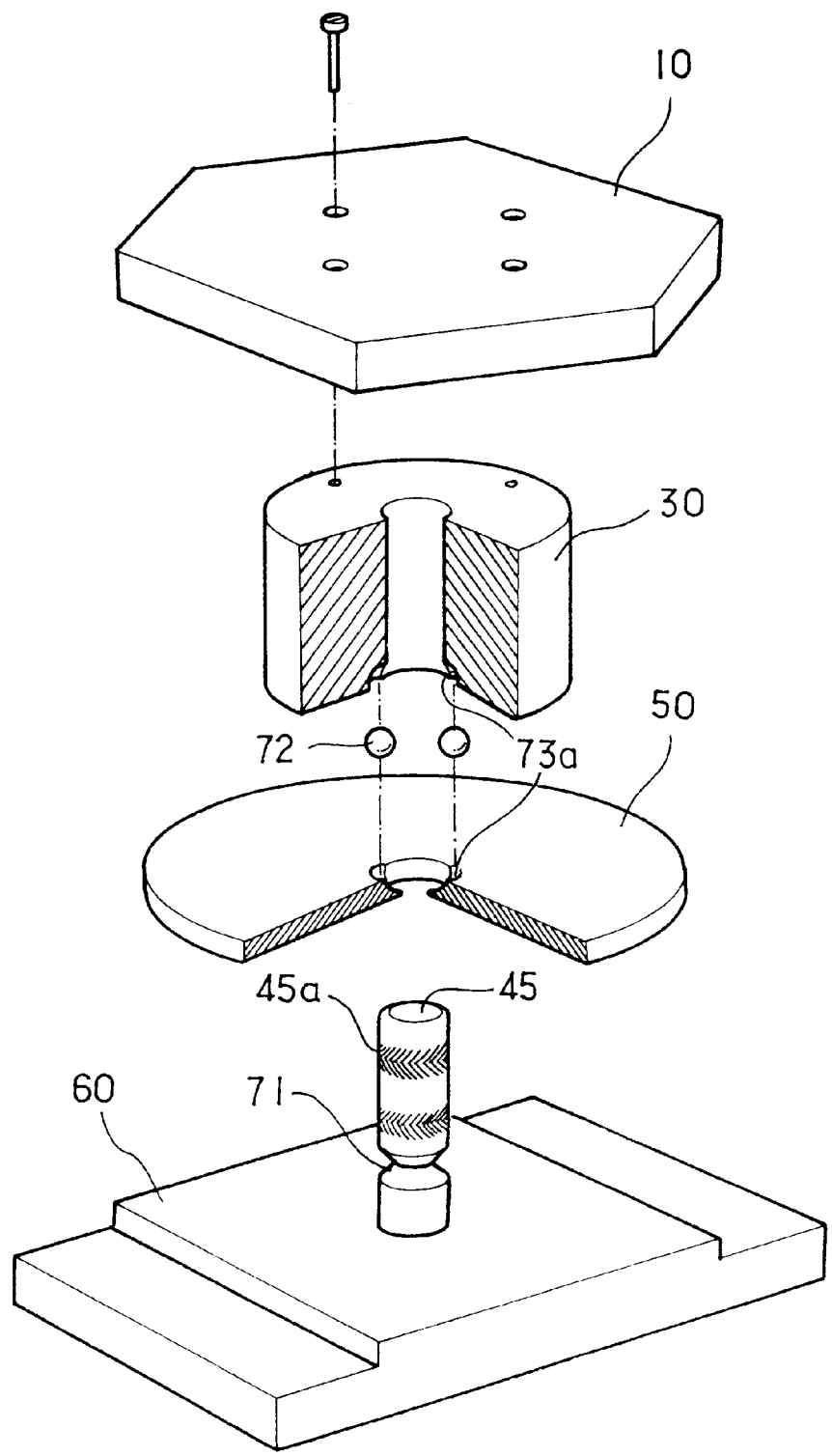
FIG. 5 is an exploded view illustrating a fluid bearing apparatus having individual ball inserting grooves formed on the bushing and plate of the present invention.

In the first embodiment of the present invention (see FIG. 3), a v-shaped first ball inserting groove 71 is formed in the surface of the fixing shaft 40. The groove 71 faces the bushing 30 or the plate 50. A hemispheric shaped second ball inserting groove 73 is formed on the internal surface of the bushing 30 at a position facing the first ball inserting groove 71. Balls 72 are inserted into the first and second ball inserting grooves 71 and 73. At this time, the second ball inserting groove 73 is desirably formed around a boundary between the bushing 30 and the plate 50. Furthermore, the ball inserting grooves 71 and 73 may be formed as a continuous circumferential groove extending completely around the fixing shaft 40 (FIG 3) or may be formed as individual ball holding grooves 71a, 73a at predetermined intervals around the shaft 40 and bushing 30. In particular, as shown in FIG. 4, a second embodiment includes the individual ball holding grooves 71a, instead of the continuous groove 71, formed on the shaft. Another embodiment illustrated in FIG. 5 shows that the individual ball holding groove 73a, instead of the continuous ball inserting groove 73, may be formed on the bushing 30 and plate 50. In the case that the ball inserting grooves are continuous a sufficient number of balls 72 are used to fill the grooves. The ball inserting grooves 71 and 73 are disposed to form a predetermined clearance t between the upper end portion of the fixing shaft 40 and the upper end portion of the bushing 30. At this time, the upper end portion of the fixing shaft 40 is formed lower than that of the bushing 30. In addition, in the present invention, no thrust bearing is mounted between the bushing 30 and the polygon mirror 10 as in the conventional bearing apparatus.

The operation of the aforementioned fluid bearing apparatus according to the present invention will now be described in detail.

When a power source is applied, the plate 50, the bushing 30 and the polygon mirror 10 rotate. A fluid flows into a fluid inlet groove 45a of the first kinetic pressure generating groove 45 in the fixing shaft 40. As a result, a predetermined clearance is formed between the fixing shaft 40 and the bushing 30 to support a radial load caused by rotation.

At this time, since the predetermined clearance is maintained by the balls 72 which are inserted into the ball inserting grooves 71 and 73, it is possible to prevent friction between the fixing shaft 40 and the internal side of the bushing 30 from being generated when the bushing 30 starts to rotate.

Furthermore, the balls 72 rotate by pivot contact so that up and down movement of the fixing shaft 40 is prevented. Since the upper end portion of the fixing shaft 40 is formed to be lower than the upper end portion of the bushing 30 by the predetermined clearance t, any friction between the upper end portion of the fixing shaft 40 and the polygon mirror 10 can be avoided when the polygon mirror starts to rotate even if the thrust bearing is not mounted. That is, since the thrust load is supported by the balls 72 instead of the upper end portion of the fixing shaft 40, the upper end portion of the fixing shaft 40 and the polygon mirror 10 do not contact each other under the circumstances that the polygon mirror 10 stops its rotation. Desirably, the predetermined clearance t has a depth of several $\mu$m.

As aforementioned, the fluid bearing apparatus according to the present invention has the following advantages.

It is possible to prevent movement of the fixing shaft when the fluid bearing apparatus starts to rotate. The frictional resistance of the upper end portion of the fixing shaft can be reduced when the fluid bearing apparatus starts to rotate and stops its rotation. Since a thrust bearing is not mounted, between the mirror 10 and the bushing 30 there is a reduction of the number of components.

It will be apparent to those skilled in the art that various modifications and variations can be made in the fluid bearing apparatus according to the present invention without departing from the spirit or scope of the invention. For example, a rectangular or hemispheric shaped ball inserting groove may be formed. The ball inserting groove may be formed on the internal side of the bushing or both the external side of the fixing shaft and the internal side of the bushing. Thus, it is intended that the present invention cover the modifications and variations of the invention provided they come within the scope of the appended claims and their equivalents.

What is claimed is:

1. A fluid bearing apparatus for supporting a polygon mirror that is rotated by a rotor, said apparatus comprising:
   a bushing having a plate mounted on its lower end portion, said plate being mounted on said rotor;
   said polygon mirror being fixed to an upper end portion of said bushing;

a fixing shaft inserted into said opening of said bushing and having a kinetic pressure generating groove on its external side surface; and a thrust load supporting means formed between the external side of said fixing shaft and a facing internal side wall of said bushing, wherein the thrust load supporting means includes a ball inserting groove formed in said external side surface of said fixing shaft, and at least one ball inserted into said ball inserting groove.

2. The fluid bearing apparatus as claimed in claim 1, wherein said ball inserting groove has a v-shaped section.

3. The fluid bearing apparatus as claimed in claim 1, wherein said ball inserting groove is continuous around the circumference of the external side surface of said fixing shaft.

4. The fluid bearing apparatus as claimed in claim 1, wherein said ball inserting groove is formed of a plurality of individual grooves positioned at predetermined intervals along a circumferential direction of said external side surface of said fixing shaft.

5. A fluid bearing apparatus for supporting a polygon mirror that is rotated by a rotor, said apparatus comprising:

a bushing having a plate mounted on its lower end portion, said plate being mounted on said rotor;

said polygon mirror being fixed to an upper end portion of said bushing;

a fixing shaft inserted into said opening of said bushing and having a kinetic pressure generating groove on its external side surface; and a thrust load supporting means formed between the external side of said fixing shaft and a facing internal side wall of said bushing, wherein said thrust load supporting means includes a ball inserting groove formed on the internal side wall of said bushing, and at least one ball inserted onto said ball inserting groove.

6. The fluid bearing apparatus as claimed in claim 5, wherein said ball inserting groove has a hemispheric-shaped section.

7. The fluid bearing apparatus as claimed in claim 5, wherein said ball inserting groove is continuous around the circumference of said internal side wall of said bushing.

8. The fluid bearing apparatus as claimed in claim 5, wherein said ball inserting groove is formed of a plurality of individual grooves positioned at predetermined intervals along a circumferential direction of said internal side wall of said bushing.

9. The fluid bearing apparatus as claimed in claim 5, wherein said fixing shaft also passes through said plate, and wherein said ball inserting groove has a bottom portion at a boundary between the internal side walls of said bushing and said plate.

10. A fluid bearing apparatus for supporting a polygon mirror that is rotated by a rotor, said apparatus comprising:

a bushing having a plate mounted on its lower end portion, said plate being mounted on said rotor;

said polygon mirror being fixed to an upper end portion of said bushing;

a fixing shaft inserted into said opening of said bushing and having a kinetic pressure generating groove on its external side surface; and a thrust load supporting means formed between the external side of said fixing shaft and a facing internal side wall of said bushing, wherein said thrust load supporting means includes a first ball inserting groove formed in the external side surface of said fixing shaft, a second ball inserting groove formed in the internal side wall of said bushing, said first and second grooves facing each other, and balls positioned in the space formed by the first and second ball inserting grooves.

11. The fluid bearing apparatus as claimed in claim 10, wherein said first ball inserting groove has a v-shaped section and said second ball inserting groove has a hemispheric shaped section.

12. The fluid bearing apparatus as claimed in claim 11, wherein said first and said second ball inserting grooves are formed continuously around the circumferences of said external side surface of said fixing shaft and said internal side wall of said bushing.

13. The fluid bearing apparatus as claimed in claim 10, wherein one of said first and said second ball inserting grooves are formed intermittently and coextensively at predetermined intervals along the circumferences of said external side surface of said fixing shaft and said internal side of said bushing.

14. The fluid bearing apparatus as claimed in any of claims 1–13, wherein the upper end portion of said fixing shaft is lower than the upper end portion of said bushing.

\* \* \* \* \*